United States Patent [19]

Green, Sr.

[11] Patent Number: 4,790,100

[45] Date of Patent: Dec. 13, 1988

[54] FLEXIBLE FISHING LURE WITH REMOVABLE CORE MEMBER

[76] Inventor: Richard T. Green, Sr., 1023 N. 15 St., Arkadelphia, Ark. 71923

[21] Appl. No.: 164,089

[22] Filed: Mar. 4, 1988

[51] Int. Cl.⁴ ............................................. A01K 85/00
[52] U.S. Cl. .................................. 43/42.26; 43/42.28; 43/42.37
[58] Field of Search ............... 43/42.24, 42.25, 42.26, 43/42.28, 42.3, 42.37, 42.4

[56] References Cited

U.S. PATENT DOCUMENTS

| | | | |
|---|---|---|---|
| D. 239,447 | 4/1976 | Radcliff | 43/42.26 |
| 1,540,586 | 6/1925 | Adam | 43/42.26 |
| 1,865,359 | 6/1932 | Eger | 43/42.37 |
| 2,817,922 | 12/1957 | Takeshita | 43/42.28 |
| 3,100,360 | 8/1963 | Creme | 43/42.24 |
| 3,449,853 | 6/1969 | Shearer | 43/42.24 |
| 3,855,722 | 12/1974 | Moore | 43/42.28 |
| 4,672,768 | 6/1987 | Pippert | 43/42.24 |

Primary Examiner—Gene P. Crosby
Attorney, Agent, or Firm—John M. Harrison

[57] ABSTRACT

A flexible fishing lure designed for use as a "trailer" on a host lure or with a jig head, which flexible fishing lure includes a body portion provided with at least one set of oppositely-disposed legs and designed to fit inside an elongated, hollow sleeve member having a blunt head and tail segments provided on the opposite end thereof. The core member is inserted inside the companion sleeve member with the core member legs protruding from openings located in opposite sides of the sleeve member and the hook element of a host lure or a jig head may then be inserted through the sleeve member and the core member, in order to facilitate retrieval of the fishing lure as a trailer or a primary lure. The flexible fishing lure may be retrieved according to a variety of techniques which cause the core member legs and the sleeve member tail segments to undulate or flutter in the water and attract fish. In a preferred embodiment of the invention, more than one set of legs may be provided on the core member body and extended from multiple openings provided in the sleeve member.

33 Claims, 1 Drawing Sheet

FLEXIBLE FISHING LURE WITH REMOVABLE CORE MEMBER

BACKGROUND OF THE INVENTION

Field of the Invention

This invention relates to fishing lures and more particularly, to fishing lures of the flexible plastic design which may be utilized as "trailers" on host lures such as "spinner bait" lures, or with lead jig heads of various size and shape having a hook embedded therein. Such flexible plastic lures are normally constructed by injection-molding techniques and are designed to simulate plastic worms, lizards, grubs and other swimming creatures which attract black bass and other game fish.

In recent years, the sport of fishing, and especially fresh-water fishing, has evolved into a big business with millions of dollars spent annually on emphasis on taking such popular game fish as black bass, has come an economic explosion in the development and marketing of improved fishing tackle and new baits and lures in particular. Perhaps the most effective of all lures, particularly in taking black bass, is the popular plastic worm and grub-type lure, wherein flexible plastic body parts are injection-molded and shaped to simulate various types of aquatic life which attract fish.

The development of plastic compositions which closely simulate life-like creatures such as worms, lizards, grubs and the like, along with the successful designing of modern injection-molding techniques for creating such life-like replicas in large quantities at low cost, has resulted in remarkable innovation in the fishing industry. The creation of these new soft plastic lures and auxiliary tackle for casting and retrieving them, which includes light-action, sensitive rods and high-strength monofilament line of small diameter, has resulted in a multi-million dollar soft plastic lure industry. It has been found that lures of this design are highly effective in taking game fish such as crappie, black bass, small-mouth bass, trout, pike and muskie, as well as a wide variety o salt water fish, with both light and relatively heavy tackle. Furthermore, since the flexible plastic lures can be easily manufactured in large quantities, they are therefore relatively inexpensive and are available in many sizes, shapes and colors for use under a wide variety of fishing conditions.

Many of these soft plastic lures are used in cooperation with a lead sinker or helmet which is placed on the fishing line immediately above the hook with the hook projected through the fishing lure in one of many possible configurations. The lead sinker or helmet allows the worm and hook to sink to the bottom of a lake or reservoir and the lure is retrieved using a variety of rod actions, depending upon the type of fish sought, the water depth and the weather conditions. Alternatively, the hook portion of a a jig head having a hook embedded or molded therein can be inserted through the lure and the lure retrieved in the same manner. Further in the alternative, flexible plastic lures can be used as "trailers" attached to other baits such as the popular "spinner baits", to attract fish.

A large number of these soft plastic lures are characterized by short, stubby "grub"-type lures, some of which include long, thin ribbon tails which are curved or shaped to present a wiggling or undulating simulated swimming action in the water when retrieved, in order to further attract fish to the lure. A wide variety of tail shapes, sizes, colors and thicknesses are currently used in many of the injection-molded soft plastic fishing lures which are on the market today.

Various fishing lures, many of which are shaped from injection-molded plastic materials, are well known in the prior art. An early flexible fishing lure is detailed in U.S. Pat. No. 2,572,608, dated Oct. 23, 1951, to W. Gabor. The Gabor "Artificial Fish Bait" includes an elongated body of compressibly resilient rubber having a cured exterior surface and provided with an elongated slit extending through one side thereof, the walls of the slit composed of sticky, uncured, self-sealing rubber. The slit provides a self-sealing groove for reception and anchored retention of the hook shank portion of a conventional fish hook. U.S. Pat. No. 2,979,850, dated Apr. 8, 1961, to T. C. Lund, details an "Artificial Fish Lure" which is shaped in the configuration of a plastic worm and includes a sliding collar member for holding a hook and fishing line adjacent to the body of the worm. U.S. Pat. No. 3,100,360, dated Aug. 13, 1963, to M. M. Creme, details a "Precoiled Artificial Lure". The precoiled lure is shaped generally in the shape of an elongated worm having a coiled memory molded therein, such that the unstressed worm assumes a normal, coiled configuration and straightens to a predetermined configuration for retrieval in a rotational motion. An "Artificial Fish Bait" is detailed in U.S. Pat. No. 3,449,953, dated June 17, 1969, to W. E. Shearer. The artificial fish bait is formed of a spine-like link of soft, limp wool yarn or similar fiber surrounded by an elongated body shaped of a soft plastic. The body is shaped, colored and marked to resemble a worm, eel or snake and the yarn forms a limp bone-like supporting member for the body. The yarn extends axially and continuously through the body and is exposed at each end thereof. U.S. Pat. No. 3,631,626, dated Jan. 4, 1972, to Francis P. Keenan, details a "Grooved Fishing Lure". This fishing lure is shaped generally in the configuration of a worm and includes spiral grooves provided in the surface thereof to texture the worm in a desired pattern. An "Action Lure" is detailed in U.S. Pat. No. 3,992,800, dated Nov. 23, 1976, to Ernest M. Neal. The lure includes a head and tail and a flexible core connecting the head and the tail, with ribbed members extending radially from the core and positioned concentric therewith. The ribbed members are spaced from each other along the length of the core and multiple shell members extend (between adjacent ribbed members to form air pockets. A "Plastic Artificial Fishing Lure" is illustrated in U.S. Pat. No. Des. 239,281, dated Mar. 23, 1976, to William O. Williams, Jr. The lure is shaped generally in the configuration of a frog, with outwardly-curled leg portions attached to the body member in order to simulate a swimming action when the lure is retrieved. U.S. Pat. No. 4,074,455, dated Feb. 21, 1978, to William O. Williams, Jr., details a "Fishing Lure" having a molded, soft plastic body formed with a surface having multiple, closely spaced, relatively small pockets of generally hemispherical configuration that releasably retain air bubbles when the lure is immersed. The bubbles provide a scaly appearance and have a glistening effect on the surface of the lure and release of the bubbles during lure retrieval creates life-like breathing effect for enhanced visual and vibrational fish attraction. A tail portion is constructed of flat flexible strip material or hair-like strands and has an inner end embedded in the moldable plastic body, for easy and secure attachment of the tail portion to the body. A "Bubbling Fishing Lure" is detailed in U.S. Pat. No. 4,197,667, dated Apr. 15, 1980, to Ronald A. Helfenstine, et al. The bubbling fishing lure includes a textured body portion having a curved tail at the end thereof, with at least one cone-shaped air trap pocket provided in the body portion for trapping and releasing air bubbles in the water. The soft, flexible, resilient body structure permits water to squirt from the pocket or pockets when a fish strikes the lure. U.S. Pat. No. 4,214,396, dated July 29, 1980, to Herman P. Firmin, details "Fishing Lures", each of which includes an elongated, beaded body provided with a curved tail and an extended thin, flexible dorsal fin which ripples and undulates when the lure is retrieved. A copy of these patents is provided.

It is an object of this invention to provide a new and improved soft plastic lure body which is designed for use with a lead jig head having an embedded hook, which lure body is characterized by a core member having at least two legs extending therefrom, the core member designed to fit inside an exterior, hollow sheath or sleeve member with the legs projecting from openings in the sleeve member.

Another object of the invention is to provide a new and improved plastic grub-type fishing "trailer" lure which is characterized by a hollow, tubular sleeve member provided with a segmented tail at one end and opening in the sides thereof and a pellet-shaped core member provided with at least two legs extending therefrom, which core member is designed to fit snugly and removably inside the hollow interior of the sleeve member with the legs protruding from the openings in the sleeve member.

Still another object of this invention is to provide a new and improved soft plastic worm or grub-type lure having an elongated, hollow sheath or sleeve member fitted with a removable internal core member having at least one pair of legs, which legs project through oppositely-disposed openings in the sleeve member and flutter and undulate when the lure is retrieved as a "trailer" on a companion or host lure or by means of a jig head having a hook extending through the sleeve and core members.

Still another object of this invention is to provide a two-piece, sleeved fishing lure, the first or sleeve element of which is characterized by an elongated, hollow sheath having a blunt end and multiple tail or skirt segments at the opposite open end thereof and at least two openings provided in oppositely-disposed relationship, spaced from the tail segments. The second element is characterized by a pellet-like core member provided with at least one pair of oppositely-disposed legs extending therefrom, the core member designed to fit inside the sleeve member with the legs extending through the matching openings in the sleeve member. A jig head having a hook embedded therein may be used with the lure, wherein the hook is extended through the sheath member and the core member for attaching the jig head to the lure and retrieving the lure.

SUMMARY OF THE INVENTION

These and other objects of the invention are provided in a new and improved flexible, soft plastic fishing lure, which lure includes as a first element, an elongated, hollow sleeve member having a blunt nose at one end and provided with at least two oppositely-disposed openings communicating with the interior thereof and multiple tail or skirt segments extending from the opposite open end thereof. A pellet-shaped core member having at least two legs provided therein is designed to fit inside the hollow interior of the sleeve member, with the legs projecting through the openings in the sleeve member, in order to accomodate the hook portion of a host lure or a jig head for casting and retrieving the lure.

BRIEF DESCRIPTION OF THE DRAWING

The invention will be better understood by reference to the accompanying drawing, wherein.

DESCRIPTION OF THE PREFERRED EMBODIMENTS

Figure 1:
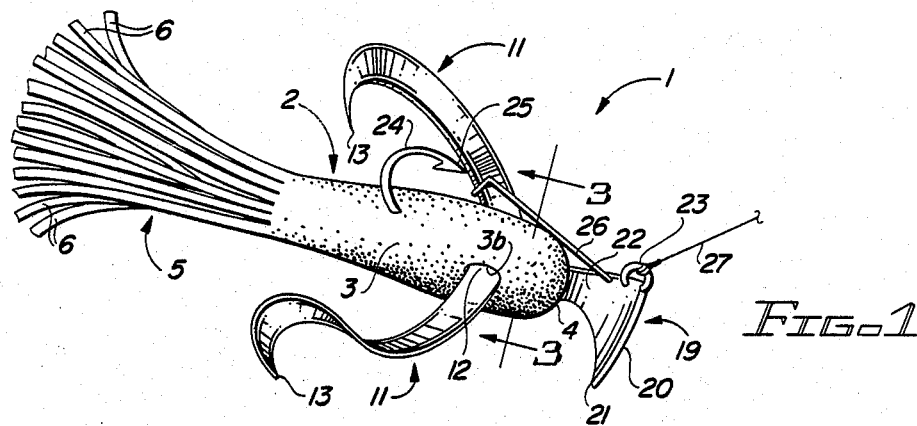
FIG. 1 is a perspective view of a preferred embodiment of the flexible fishing lure with removable core member of this invention.
Figure 2:
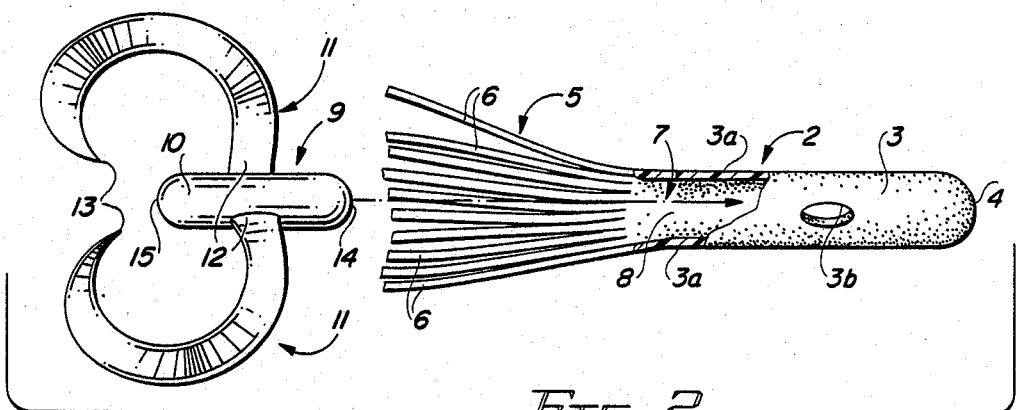
FIG. 2 is an exploded view of the lure, more particularly illustrating the respective sleeve and core elements thereof.
Figures 3, 4:
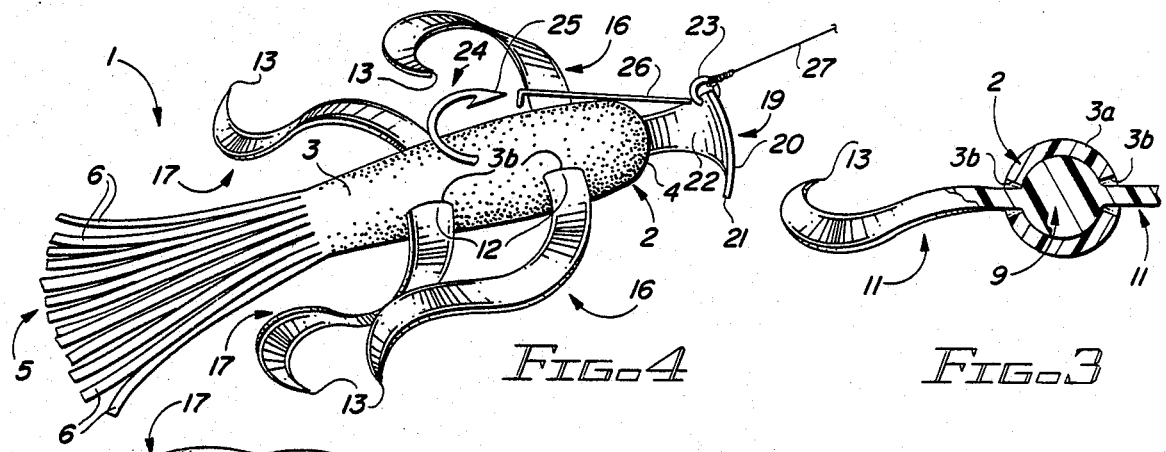
FIG. 3 is a lateral sectional view of a preferred core member element of the fishing lure illustrated in FIGS. 1 and 2.
FIG. 4 is a perspective view of an alternative embodiment of the flexible fishing lure.

Referring to FIGS. 1–3 of the drawing and to FIGS. 1 and 2 in particular, the flexible fishing lure with removable core member (hereinafter referred to as "flexible fishing lure") of this invention is generally illustrated by reference numeral 1. The flexible fishing lure 1 is characterized by an elongated, hollow sleeve member 2, characterized by a tubular capsule 3 which is shaped to define a rounded capsule head 4, extending rearwardly and terminating in a skirt 5, defined by multiple skirt streamers 6. A pair of capsule openings 3b are provided in oppositely-disposed relationship in the capsule wall 3a of the capsule 3 at points which are intermediate the capsule head 4 and the skirt 5. The capsule openings 3b communicate with a cavity 7 provided in the capsule 3 of the sleeve member 2, which cavity 7 is designed to receive the pellet-like body portion 10 of the core member 9, through an access 8, located at the base of the skirt 5, as illustrated in FIG. 2. The body portion 10 of the core member 9 is further provided with a pair of thin, ribbon-like legs 11 which are shaped integrally with the body portion 10 and extend in oppositely-disposed relationship from the body portion 10 intermediate the rounded core member front 14 and core member rear 15. In a preferred embodiment of the invention, the ribbon-like legs 11 are curved inwardly and rearwardly from the leg roots 12 away from the core member front 14 and toward the core member rear 15 and terminate in pointed leg tips 13, respectively, as further illustrated in FIGS. 1–3.

Referring again to FIG. 2 of the drawing, when the body portion 10 of the core member 9 is inserted inside the cavity 7 provided in the capsule 3 of the sleeve member 2, the legs 11 are extended through the capsule openings 3b, respectively, such that the leg tips 13 are curled inwardly in close proximity to the skirt 5 of the sleeve member 2 when the flexible fishing lure 1 is not being retrieved. When retrieved, the flexible fishing lure 1 "swims" through the water with the leg tips 13 and legs 11 fluttering rearwardly, along with the skirt streamers 6 of the skirt 5.

Referring again to FIG. 1 of the drawing, a jig head 19 is added to the sleeve member 2 and core member 9 combination, by inserting the hook tip 25 of the embedded hook 24 into the center of the capsule head 4 and extending the hook 24 through the body portion 10 of the core member 9 and from the sleeve member 2 at a point approximately half the distance along the length of the sleeve member 2, as illustrated. In a preferred configuration, a portion of the neck 22 of the jig head 19 is embedded in the capsule head 4 of the sleeve member 2, with the hook tip 25 extending forwardly, approximately parallel to the sleeve member 2. The eye 23 of the hook 24 is located adjacent to the jig head 14 for the attachment of a line 27, in order to cast and retrieve the flexible fishing lure 1.

It will be appreciated by those skilled in the art that although the flexible fishing lure 1 is illustrated in FIG. 1 with a single pair of legs 11 extending from the core member 9 and from oppositely-disposed capsule openings 3b provided in the capsule 3 of the sleeve member 2, additional legs 11 can be provided on the body portion 10 of the core member 9, as desired. Accordingly, referring to FIGS. 4 and 5, under circumstances where additional legs 11 are desired, the body portion 10 of the core member 9 is injection-molded or otherwise fabricated with a pair of front legs 16 and a pair of rear legs 17 projecting from the body portion 10 of the core member 9 in a desired spacial relationship. A corresponding number of spaced capsule opening 3b are provided in the capsule 3 of the sleeve member 2, in order to accommodate the front legs 16 and rear legs 17, as illustrated.

Figure 5:
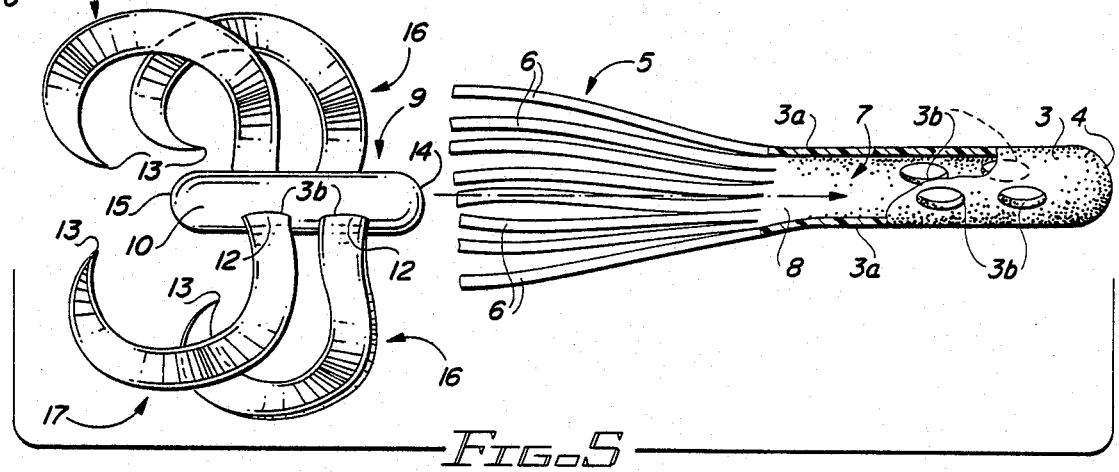
FIG. 5 is an exploded view of the alternative lure embodiment illustrated in FIG. 4.

In another preferred embodiment of the invention, the cavity 7 provided in the capsule 3 of the sleeve member 2 extends rearwardly from the capsule head 4 through the sleeve member 2 in both the FIGS. 1 and 2 and the FIGS. 4 and 5 embodiments, such that the skirt 5 of each sleeve member 2 is open at the access 8 to facilitate insertion of the selected body portion 10 inside the respective capsule 3. Furthermore, it will also be appreciated that both the sleeve member 2 and the core member 9 can be molded of soft plastic in any selected size and consistency, depending upon the type of fish to be taken and whether the flexible fishing lure 1 is to be used as such with the jig head 19 or the sleeve member 2 and core member 9 combination is to be used in cooperation with another host lure, as a "trailer".

Referring again to the drawing, it is further understood by those skilled in the art that while the respective legs 11 are illustrated in inwardly-curved configuration with the leg tips 13 terminating adjacent to the skirt 5, the legs 11 can be curved in the opposite direction away from the sleeve member 2 and, regardless of the direction of curvature, may be optionally split into multiple segments in the same manner as the skirt streamers 6, according to the knowledge of those skilled in the art. The legs 11 may also be molded or otherwise constructed in any desired number and of any selected length, thickness and color and may project from the body portion 10 of the core member 9 and through corresponding capsule openings 3b in any desired spacing and spatial orientation. Furthermore, it will also be appreciated that the jig head 19 can be designed in any desired configuration, the configuration illustrated in the drawing being illustrative only. However, as illustrated in FIGS. 1 and 4 of the drawing, in a most preferred embodiment, the jig head 19 is shaped to define a convex or a flat head portion 20, which terminates in a head portion tip 21. The head portion 20 narrows beneath the head portion tip 21 to define a tapered neck 22, which is partially embedded in the capsule head 4 of the capsule 3. An optional hook guard 26 extends from the top segment of the head portion 20 toward the hook tip 25 and terminates in spaced relationship with respect to the hook tip 25.

It will be appreciated by those skilled in the art that the flexible fishing lure detailed herein is characterized by convenience, in that the lure is capable of being used both with a jig head as a primary lure and without a jig head as a "trailer" on other lures, such as "spinner baits". Furthermore, both the sleeve member 2 and the core member 9 can be molded in substantially any desired color and core members 9 of various color and having legs 11 of any selected length, thickness, color and other character and design can be inserted in a companion sleeve member 2 of the same or a different color. Furthermore, if one or more of the legs 11 is damaged during retrieval of the flexible fishing lure 1, the jig head 19 or a host lure hook (as the case may be) can be removed from the sleeve member 2 and core member 9 combination, the damaged core member 9 removed, and a new core member 9 of selected character and design reinserted in the sleeve member 2 through the access 8, as illustrated in the drawings. The respective legs 11 are then extended through the companion capsule openings 3b in the capsule 3 of the sleeve member 2 and the flexible fishing lure is again ready for use.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A flexible fishing lure comprising an elongated sleeve member having a cavity provided therein and at least one opening provided in said sleeve member intermediate the ends of said sleeve member, said opening communicating with said cavity; a core member provided in said cavity of said sleeve member; hook means extending through said sleeve member and said core member; and at least one leg means carried by said core member, said leg means projecting through said opening for attracting fish responsive to retrieval of said flexible fishing lure.

2. The flexible fishing lure of claim 1 wherein said hook means further comprises a jig head substantially seated against one end of said sleeve member and a hook embedded in said jig head, said hook projecting through said sleeve member and said core member and terminating outside of said sleeve member in an exposed hook tip.

3. The flexible fishing lure of claim 2 further comprising guard means carried by said jig head, said guard means extending toward said hook tip.

4. The flexible fishing lure of claim 3 wherein said guard means further comprises a single wire guard.

5. The flexible fishing lure of claim 1 further comprising tail mean extending from one end of said sleeve member for attracting fish responsive to retrieval of said flexible fishing lure.

6. The flexible fishing lure of claim 5 wherein said tail means further comprises a skirt characterized by a plurality of flexible skirt streamers.

7. The flexible fishing lure of claim 5 wherein said hook means further comprises a jig head substantially seated against the opposite end of said sleeve member and a hook embedded in said jig head, said hook projecting through said sleeve member and said core member and terminating outside of said sleeve member in an exposed hook tip.

8. The flexible fishing lure of claim 7 further comprising guard means carried by said jig head said guard means extending toward said hook tip and wherein said tail means further comprises a skirt characterized by a plurality of flexible skirt streamers.

9. The flexible fishing lure of claim 1 wherein said at least one opening further comprises a pair of openings provided in oppositely-disposed relationship in said sleeve member and said at least one leg means further comprises a pair of flexible, ribbon-like legs projecting through said openings, respectively.

10. The flexible fishing lure of claim 9 wherein said hook means further comprises a jig head substantially seated against one end of said sleeve member and a hook embedded in said jig head, said hook projecting through said sleeve member and said core member and terminating outside of said sleeve member in an exposed hook tip.

11. The flexible fishing lure of claim 10 further comprising tail means extending from the opposite end of said sleeve member for attracting fish responsive to retrieval of said flexible fishing lure.

12. The flexible fishing lure of claim 11 further comprising guard means carried by said jig head, said guard means extending toward said hook tip.

13. The flexible fishing lure of claim 11 wherein said tail means further comprises a skirt characterized by a plurality of flexible skirt streamers.

14. The flexible fishing lure of claim 11 wherein said tail means further comprises a skirt characterized by a plurality of flexible skirt streamers and further comprising guard means carried by said jig head, said guard means extending toward said hook tip.

15. The flexible fishing lure of claim 14 wherein said guard means further comprises a single wire guard.

16. The flexible fishing lure of claim 1 wherein said at least one opening further comprises a plurality of openings provided in spaced relationship in said sleeve member and said at least one leg means further comprises a plurality of flexible legs projecting through said openings, respectively.

17. The flexible fishing lure of claim 16 wherein said hook means further comprises a jig head substantially seated against one end of said sleeve member and a hook embedded in said jig head, said hook projecting through said sleeve member and said core member and terminating outside of said sleeve member in an exposed hook tip.

18. The flexible fishing lure of claim 17 further comprising tail means extending from the opposite end of said sleeve member for attracting fish responsive to retrieval of said flexible fishing lure.

19. The flexible fishing lure of claim 18 further comprising guard means carried by said jig head, said guard means extending toward said hook tip.

20. The flexible fishing lure of claim 18 wherein said tail means further comprises a skirt characterized by a plurality of flexible skirt streamers.

21. The flexible fishing lure of claim 18 wherein said tail means further comprises a skirt characterized by a plurality of flexible skirt streamers and further comprising guard means carried by said jig head, said guard means extending toward said hook tip.

22. The flexible fishing lure of claim 21 wherein said guard means further comprises a single wire guard.

23. A flexible fishing lure comprising an elongated sleeve member having a head portion, a tail portion and a cavity extending through said sleeve member between said head portion and said tail portion; at least one opening provided in said sleeve member intermediate said head portion and said tail portion, said opening communicating with said cavity; a core member provided in said cavity of said sleeve member; and at least one leg means carried by said core member and projecting from said cavity through said opening for attracting fish responsive to retrieval of said flexible fishing lure.

24. The flexible fishing lure of claim 23 further comprising tail means extending from said tail portion of said sleeve member for attracting fish responsive to retrieval of said flexible fishing lure.

25. The flexible fishing lure of claim 24 wherein said tail means further comprises a skirt characterized by a plurality of flexible skirt streamers.

26. The flexible fishing lure of claim 23 further comprising a jig head substantially seated against said head portion of said sleeve member and a hook embedded in said jig head, said hook projecting through said sleeve member and said core member and terminating outside of said sleeve member in an exposed hook tip.

27. The flexible fishing lure of claim 26 further comprising guard means carried by said jig head, said guard means extending toward said hook tip.

28. The flexible fishing lure of claim 25 wherein said at least one opening further comprises a pair of openings provided in oppositely-disposed relationship in said sleeve member and said at least one leg means further comprises a pair of flexible, ribbon-like legs projecting through said openings, respectively.

29. The flexible fishing lure of claim 25 wherein said at least one opening further comprises a plurality of openings provided in spaced relationship in said sleeve member and said at least one leg means further comprises a plurality of flexible legs projecting through said openings, respectively.

30. A flexible fishing lure comprising an elongated sleeve member terminated at one end by a rounded head and at the opposite end by flexible tail means, said sleeve member having a hollow interior; at least two openings provided in said sleeve member said openings communicating with said hollow interior; a generally pellet-shaped core member adapted for insertion in said hollow interior of said sleeve member, and at least two flexible leg members carried by said core member, said flexible leg members projecting through said openings in said sleeve member, respectively, whereby said leg members and said tail means simulate a swimming action when said lure is retrieved.

31. The flexible fishing lure of claim 30 further comprising a jig head substantially seated against said rounded head of said sleeve member and a hook embedded in said jig head, said hook projecting through said sleeve member and said core member and terminating outside of said sleeve member in an exposed hook tip.

32. The flexible fishing lure of claim 31 further comprising guard means carried by said jig head, said guard means extending toward said hook tip.

33. The flexible fishing lure of claim 32 wherein said guard means further comprises a single wire guard.

* * * * *